(No Model.)
B. F. PEET.
SEAT FOR BICYCLES.
No. 290,919. Patented Dec. 25, 1883.
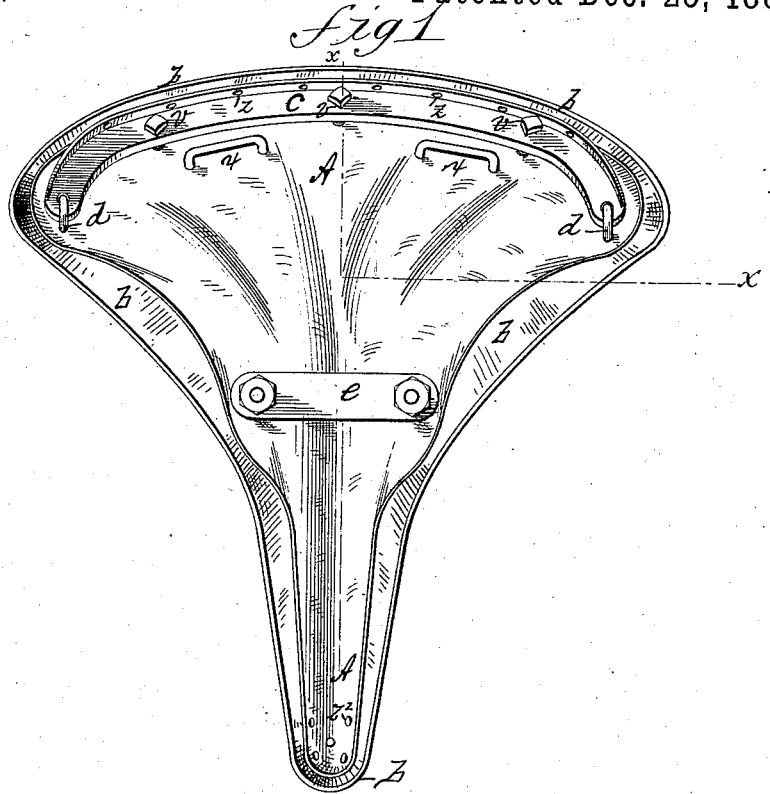
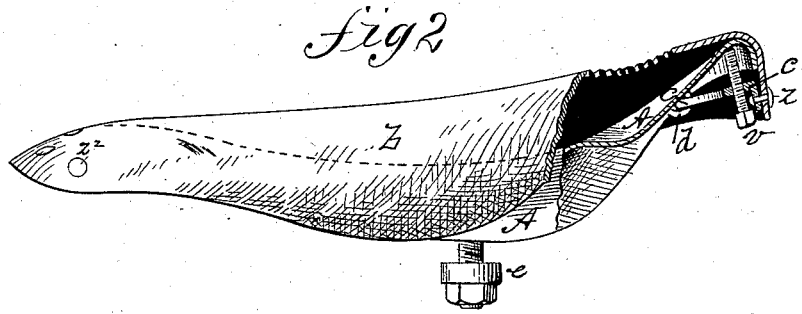
WITNESSES:
INVENTOR
Benjamin F. Peet
BY Harry A. Chapin
ATTORNEY

UNITED STATES PATENT OFFICE.

BENJAMIN F. PEET, OF SPRINGFIELD, MASSACHUSETTS, ASSIGNOR OF ONE-HALF TO ROBERT T. YOUNG, OF BROOKLYN, NEW YORK.

SEAT FOR BICYCLES.

SPECIFICATION forming part of Letters Patent No. 290,919, dated December 25, 1883.

Application filed September 24, 1883. (No model.)

*To all whom it may concern:*

Be it known that I, BENJAMIN F. PEET, a citizen of the United States, residing at Springfield, in the county of Hampden and State of Massachusetts, have invented new and useful Improvements in Suspension-Seats for Bicycles and other Vehicles, of which the following is a specification.

This invention relates to improvements in suspension-seats for bicycles and other vehicles, the object being to provide improved means for supporting a seat in a suspended position over its frame or base, and for taking up the stretch of the material, so that it may not be forced by the weight of the rider upon any rigid portion of the frame beneath it.

In the drawings forming part of this specification, Figure 1 is a plan view of the bottom of a seat embodying my improvements. Fig. 2 is a side elevation, partly in section.

In the drawings, A is the usual corrugated sheet-metal seat-frame, having a pommel-shaped forward end, and having its rear end or border curved downward. The usual yoke, by which the seat is secured to the vehicle, is indicated by $e$. Ordinarily the leather seat $b$ is secured by rivets to the ends of the frame A after having been stretched as much as possible; but continued weight upon the seat gradually draws it down against the frame beneath when the seat becomes uncomfortable for the rider.

My improvements provide means for keeping the seat-leather $b$ under proper tension, and for regulating the latter with great facility, according to the wish of the rider. The rear end of the seat-frame A is provided with a circular or curved yoke, $c$, having a turned-up outer border-like angle-iron, which is hinged to the frame by the staples $d\,d$ or other similar means, and has a series of screws, $v$, adapted to turn in the yoke, and having their ends bearing against the frame A, whereby the yoke is given a swinging movement to and from the latter. The seat-leather $b$ is riveted (by rivets $z^2$) or otherwise suitably and rigidly attached to the small or pommel end of frame A, and, as usual, is of sufficient size to cover and hang over the borders of the frame. The rear wide end of seat $b$ is carried over the aforesaid curved end of frame A at the rear, and is firmly attached to the border of the yoke $c$ by the rivets $z$ or other suitable means. The seat-leather $b$ is then drawn to the proper tension over the upper surface of the frame A by forcing the screws $v$ against the latter under the yoke, and causing the latter to swing from the frame, thereby suspending the seat-leather by its two ends over the part of the frame therebetween; and by operating screws $v$ the leather may be strained to suit the convenience of the rider.

The staples $x$ are those usually secured to frame A, whereby parcels are secured to the latter by straps passing through them.

What I claim as my invention is—

1. The combination, with the seat frame A, and with the elastic seat material $b$, secured rigidly to one end of the frame of the yoke $c$, having the free end of said material secured thereto, and capable, by means substantially as described, of a swinging movement toward and from the frame, substantially as set forth.

2. In combination, the frame A, the yoke $c$, hinged to said frame, and provided with screws passing through it and bearing against the latter, and the seat material $b$, secured by one end to the frame and by the other to said yoke, substantially as set forth.

BENJAMIN F. PEET.

Witnesses:
H. A. CHAPIN,
J. D. GARFIELD.